Aug. 15, 1939.  T. B. CHACE  2,169,354
METHOD OF AND MEANS FOR PRODUCING STEEL CLAD WITH STAINLESS STEEL
Filed Feb. 17, 1936  2 Sheets-Sheet 1
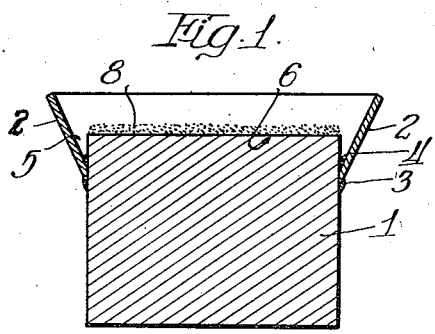
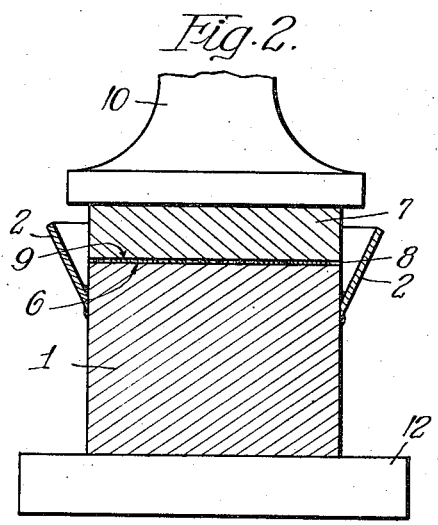
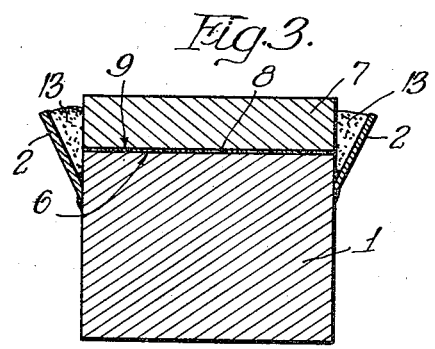
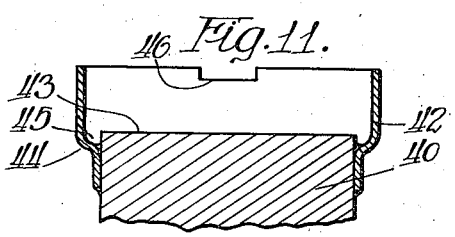
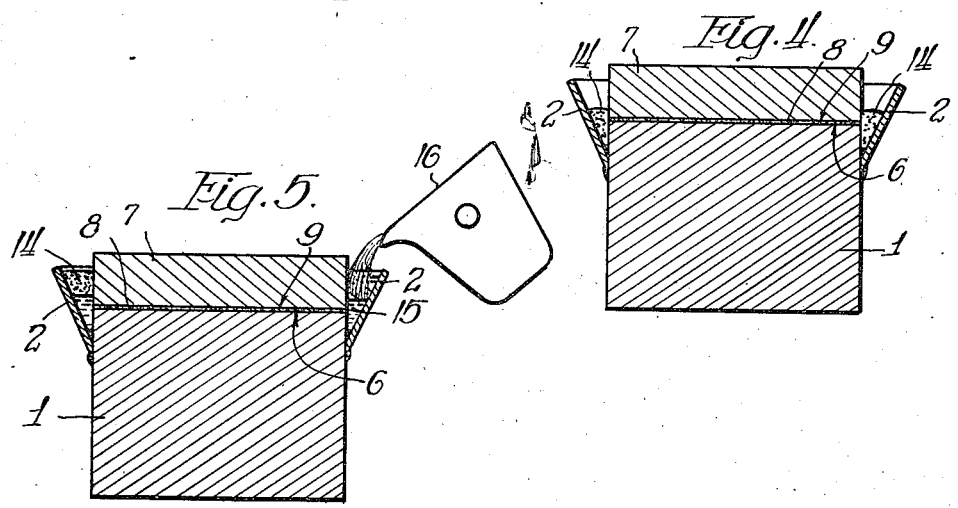
Inventor:
Thomas B. Chace.
By Brown, Jackson, Boettcher & Dienner
Attys.

Aug. 15, 1939.   T. B. CHACE   2,169,354
METHOD OF AND MEANS FOR PRODUCING STEEL CLAD WITH STAINLESS STEEL
Filed Feb. 17, 1936   2 Sheets-Sheet 2
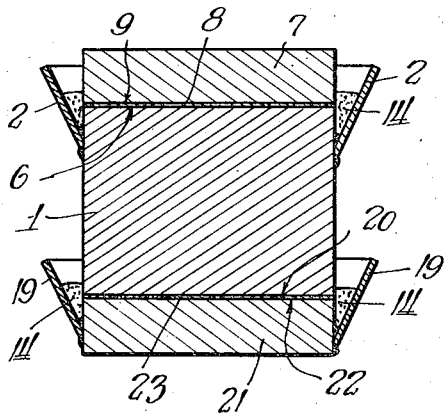
Inventor:
Thomas B. Chace
By Brown, Jackson, Boettcher, Dienner
Attys.

Patented Aug. 15, 1939

2,169,354

UNITED STATES PATENT OFFICE 2,169,354

METHOD OF AND MEANS FOR PRODUCING STEEL CLAD WITH STAINLESS STEEL

Thomas B. Chace, Winnetka, Ill., assignor, by direct and mesne assignments, to Clad Metals Industries, Inc., a corporation of Illinois Application February 17, 1936, Serial No. 64,281

12 Claims. (Cl. 29—189)

My invention relates to a method of and means for uniting two bodies of metal of similar melting points, such as open hearth steel and stainless steel, for producing a composite article such as steel clad with stainless steel.

In bonding two metals or alloys of widely dissimilar melting points, as is the case in bonding a copper alloy to steel, I have found it possible, by having the low melting point metal or alloy in liquid form at a temperature well above its melting point, to create a bond suitable for the conversion of the resulting ingot into plates or sheets. The difference in melting temperatures of the two metals permits this type of process to be employed without excessive diffusion of the two metals with respect to each other. However, in bonding two metals or alloys of similar melting temperatures, such as stainless steel and open hearth steel, by pouring one metal or alloy in molten form into contact with the other metal or alloy, the melting temperatures are so near to each other that it is difficult to radiate heat fast enough to prevent excessive diffusion of the two metals and maintain an accurate, definite bond line between the two. This is particularly true of comparatively large slabs, as considerable pouring is necessary and the heat content is high and difficult to control. In attempting to bond together two blocks of metal or alloy without the melting of one or the other, it is difficult to get the two surfaces into close or intimate contact so that diffusion and bonding can occur. This is particularly true in larger masses, or where the surfaces, for other reasons, are not absolutely in planar contact. Furthermore, stainless steel contains a large amount of chromium and the chromium content introduces difficulties, first, because of a tendency to oxidize and form a coating even at relatively low temperatures and with slight exposure to the air, and next, because the chromium combines very readily with carbon, both of which appear to be inimical to securing the bond.

Furthermore, I have found that unless special steps are taken to produce a ductile bond, the coalescing of the two metals produces a brittle composition or alloy which will not stand conversion or forming of the product. The bond should have depth, ductility, and suitable work hardening properties.

The chief aim of the present invention is to provide an improved process and means for overcoming the difficulties heretofore encountered and particularly those above enumerated.

It is an object of the present invention to provide an improved process of and means for producing stainless clad steel.

A further object is to provide an improved process of and means for bonding together two bodies of high melting point metal or alloy, or metal to alloy, suitable for producing a composite product, such as stainless clad steel.

It is a further object of the invention to provide an improved bond at the junction of two similar metals, such as low carbon steel and stainless steel.

A further object of the invention is to provide a new method of and means for bringing the surfaces of two meeting slabs or plates into diffusing or bonding relation, particularly when the surfaces are uneven.

It is a further object of the present invention to provide a new method of sealing the meeting faces against the entry of air or oxygen or other gases.

A further object of the invention is to provide a new method of mechanically joining the edges of slabs to hold them together prior to and during bonding or conversion.

A further object of the invention is to provide an improved method of producing composite articles such as plates, sheets, and the like, with a facing of a different metal, such as stainless steel, on each side of the main body of metal, such as low carbon steel.

A further object of the invention is to provide an improved method of producing composite articles with one type of metal or alloy such as stainless steel on one side of the body of steel, and copper or copper alloy, or a similar low melting point metal or alloy on the other side.

A further object of the invention is to provide an improved method of pouring one metal or alloy into contact with another metal or alloy when the two have either substantially the same melting point, or different melting points, whereby to control the diffusion of one metal into the other, or to control the mutual diffusion of the metals.

A further object of the invention is to provide a method of utilizing scrap as a source of one metal or alloy in the production of a composite product, such as stainless clad steel.

Now in order to acquaint those skilled in the art with the manner of practicing my invention I shall describe, in connection with the accompanying drawings, the specific devices and steps or methods which may be employed in practicing my invention.

In the drawings:

Figure 1 is a vertical cross section of a mold made up of a mild steel base with mold strips erected around the upper periphery of the same and having powdered bonding metal applied to the upper surface of the steel base;

Figure 2 is a side elevational view showing the mold block with a stainless steel block applied thereto, the assembly being placed under hydraulic pressure;

Figure 3 shows the assembly in cross section with powdered sealing material added to the mold opening prior to heating of the assembly;

Figure 4 shows the assembly with the sealing material after it is melted into liquid form sealing the junction of the two slabs;

Figure 5 is a cross section of the assembly showing the sealing material displaced by the introduction of a molten high melting point metal poured into the mold around the junction of the two slabs or blocks to seal and mechanically bond the edges of the two blocks;

Figure 6 is a vertical cross section of an assembly for producing three-ply material, that is, steel clad on each side with stainless steel;

Figure 7 shows a double composite, or two-ply assembly;

Figure 8 is a fragmentary cross section through the two blocks, showing their meeting surfaces and the mold strip with molten metal bonded to the margins of the two blocks, both by fusion and mechanical bonding;

Figure 9 is a view similar to Figure 8 showing a modified form of mould strip to permit a common peripheral bond for four layers;

Figure 10 is a vertical cross-section through an assembly, showing a steel block with a stainless facing on one side and a copper alloy facing on the other; and Figure 11 is a fragmentary cross section of a mould block suitable for receiving molten stainless steel upon a block of steel or vice versa.

One of the problems which makes difficult the welding of composite slabs of mild steel and stainless steel for converting into stainless clad steel plates and the like is the difference in coefficients of expansion between mild steel and most of the stainless steels. Low carbon steel has a heat expansion of .000013 per degree C. and the most useful for cladding of the stainless steels,—namely, 18 per cent chromium and 8 per cent nickel, has a heat expansion of .000017. Another of the stainless group, (16 per cent chromium), has a heat expansion of .0000108 per degree C. This dissimilar expansibility in the two metals is not particularly objectionable in the finished stainless clad steel plate, as temperature ranges in the field of application of the product are comparatively narrow and very little, if any, warping takes place. In welding opposing aces of the two slabs together, this presents a problem as the faces must be kept in contact throughout the entire surfaces and be entirely sealed from oxidizing atmosphere, and not joined so as to retard individual free elongation until the surfaces have been welded to each other. For instance, if the slabs are assembled one over the other and arc welded at the union around the edges to temporarily hold them together and exclude air, as is successfully done in cladding nickel to mild steel (as nickel has the same coefficient of expansion as steel), and subjected to furnace temperatures of 1700° F. to 2200° F. for welding, the difference in expansion causes the stainless slab to warp or bow, which prevents diffusion where the surfaces are not in contact, or the high force exerted breaks the arc weld open, permitting furnace atmosphere to oxidize the faces, which prevents welding. Chromium oxidizes very readily at high temperatures and must be perfectly sealed from oxidizing atmosphere until welding is completed.

Chromium and its alloys have a powerful affinity for carbon, and excessive carbon pick-up during welding seems to embrittle the alloy at the union. A direct weld of 18–8 stainless to low carbon steel made by diffusion has a high tensile strength in the composite slab form but opens up easily during or after rolling, whereas a weld of as high or even appreciably lower tensile strength, but having better ductility from proper alloying at the union, is essential. For successful converting from a slab and for a commercial product in plate or sheet having wide application, the weld must have a combination of properties. The stresses on the bond during converting are greater than on the finished product in fabricating for its various applications and uses, and must be capable of withstanding heating to high temperatures for hot rolling, cold rolling, annealing, shearing, flattening, and all mill operations. The finished product must stand bending, forming, annealing, seam welding, and all fabricating operations without any tendency to separate.

Another problem is the difficulty of flattening the heavy slabs so that the inner surfaces are in contact throughout the entire area. Machining the surfaces is too expensive and if not in contact diffusion cannot take place.

Referring now to Figure 1, I provide a mild steel base 1 around the upper margin of which I erect a wall of steel strip 2 which is welded externally at 3 and may also be welded internally at 4, completely around the block 1, to provide an open-topped receptacle or basin, the bottom inside surface of which is formed by the top surface of the block or base 1. The mould strips 2 are usually of the same composition as the base 1 to which they are welded. However, the strips 2 may be of a special composition of higher melting temperature than block 1, or whatever block they are welded or joined to. There is provided, as shown in Figure 1, a channel or groove 5 extending around the upper margins of the base 1 to allow, as will hereafter be explained, the bonding of a ring of molten metal to the margin of the block 1 below the top surface 6. The steel strips 2 are assembled at an angle slanting away from the edges of the upper surface and to a height just below the top surface of the stainless steel slab 7 (see Figures 2 and 3) which follows later in the assembly.

As will now be seen, this open topped basin or mold permits using a stainless steel slab of substantially the same area and yet leaves room for free expansion when the assembly is heated. The top rim of the mold strip is not joined to the stainless or upper alloy slab. Thereby the arc welding is greatly simplified, as the welding of dissimilar metals by arc welding is avoided.

After the mould is completed the upper surface 6 is cleaned by sand blasting and immediately covered to a thickness of .025 inch to .050 inch with a powdered metal or alloy which, after diffusion with both mild steel and stainless steel during welding and subsequent heating or rolling and annealing, forms an alloy at the union which is ductile enough for both hot and cold rolling, and has sufficient strength at high hot rolling temperatures that the composite plate will not separate, either during or after converting.

The powdered bonding alloy is shown in exaggerated thickness in Figure 1, at the reference numeral 8.

I prefer the employment of a bonding alloy in powdered form for several reasons, some of which are listed below and which will become more apparent as the further description of the process proceeds.

First, it is obtainable in a pure form free from the ordinary impurities found in metals and alloys made by regular practice.

Second, it can be applied immediately after sand blasting so that the cleaned surface is exposed to atmosphere only momentarily, and it is easy and inexpensive to apply.

Third, the amount or thickness can easily be varied to meet the requirements of the particular two slabs being processed.

Fourth, it has a low density which can be varied easily by changing the size of the particles and it compresses to a high density which permits compensating for unevenness of the opposing faces of the slabs by pressing into the low places and assuring surface contact and diffusion during welding heat.

Fifth, after compressing, the inner surfaces are fairly well sealed, which permits using a non-metallic, low temperature, and quick fusing material in the mould space along the ends and edges for sealing the union from furnace atmosphere.

Sixth, the powders are roughly shaped angular particles and after being pressed into intimate contact with the opposing slab surfaces, which have been roughened by sand blasting, the powdered metal adheres to the surfaces and holds the assembly together temporarily for subsequent handling before welding.

Seventh, the solid metal in immediate contact with the powdered alloy welds more readily and at a lower temperature. Also, the powdered particles, after being compressed, are interlocked and weld readily to each other at comparatively low temperatures.

I have found that powdered nickel is a very good alloying element and 70% to 90% powdered nickel with 10% to 30% powdered copper, thoroughly mixed, is even better. Pure iron, powdered, also makes a good weld. A combination of iron and nickel, or iron, nickel and copper, may also be employed. A cross section taken from the composite slab, such as that shown in Figure 3, after welding by heating and pressing but before being reduced by rolling, which has been alloyed at the union with powdered nickel, will bend about 45° without fracturing at the weld, or adjacent to the weld. Alloying the bond with nickel and copper will permit the piece to bend over to a 90° angle without fracturing.

A direct weld, obtained by temperature and pressure, of 18–8 stainless and mild steel, is quite brittle and breaks with very little bending, if any. The type of weld which is produced according to my present method will roll without separating, while the former type, that is, direct welding of 18–8 stainless to mild steel, without an interposed or additional alloying medium, will separate within the first or second pass through reducing rolls. I do not wish to limit the stainless steel to 18–8, as other known or preferred alloys may be employed for this purpose.

The welding surface 9 of the stainless steel slab 7 is sand blasted and immediately placed on top of the powdered metal 8 as shown in Figure 1. Sand blasting is preferred to pickling for cleaning the surface, as it seems to break up and remove the closely adhering oxide. Sand blasting also has a beneficial effect in producing a surface of some depth. The assembly, as shown in Figure 2, is subjected to a pressure of upwards of 5,000 lbs. per square inch, as in a hydraulic press 10—12, for compressing the powdered metal layer to about one-third of its original thickness. This fairly well seals the union between the two blocks 7 and 1, but an additional seal around the edges is desirable to completely exclude atmospheric oxygen and furnace gases, particularly when the assembly is subjected to furnace temperatures. By employing a liquid seal or luting, gas may pass out from within but entry is prevented.

The compression of the powdered nickel or powdered metal or alloy performs a unique function in that it tends to make up for minor irregularities in the surface of the two meeting faces. Also, during the heating stage, the powdered metal appears to melt and bond with the engaged surfaces much more readily than would a solid sheet. Particularly, it appears that the unit pressures, where grains of the metal bear against the fact of one or the other blocks, are very high and the heat transmission is therefore better. An incipient union begins at such points of high pressure or close thermal contact far more readily than where the surfaces are not so closely in engagement. There appears to be a lowering of the melting temperature at such concentrated points of pressure.

In order to exclude atmosphere and undesired gases from the layer of powdered metal, I fill the gutter or channel formed by the peripheral slanting walls 2, with a filling of a sealing and fluxing material 13. This space in the mould is packed with a finely powdered material which has a comparatively low fusing temperature and melts quickly when subjected to furnace temperatures of 1700° F. or upwards. A low melting point metal or alloy can be used. I have found that a substance like boric acid or borax, or preferably a mixture of these two ($H_3BO_3$ and $Na_2B_4O_7H_2O$), in the ratio of six of the former to one of the latter, is efficient and satisfactory. The fine powders pack closely and fuse almost immediately when the assembly is placed in the furnace. The liquid which is thereby formed provides a tight seal or luting which prevents the entry of atmosphere or other gases and, equally important, it allows expanding gases from within to escape. The stainless steel slab 7 is free to expand individually within the sealed enclosure and without disturbing the seal.

The borax or boric acid, or mixture of the two, when melted, has a high viscosity even at high temperatures around 2200° F., and there is very little, if any, tendency for the liquid sealing material to run between the slabs. These slabs are fairly well sealed by the compressed powdered metal layer and very little intrusion of the flux material occurs. In Fig. 4 I have shown the borax and boric acid melted down to the liquid form as indicated at 14, sealing the meeting edges of the surfaces 9 and 6.

At this stage the assembly, heated to the welding temperature, may be subjected to another pressing operation, as indicated in Figure 2, if so desired. I have found that this is not always necessary, since the intimate contact formed between the powdered metal and the contacting surfaces is of such character that when the assembly is brought to the proper temperature, bonding occurs without additional pressure, at least to the extent of allowing the assembly to be passed through the rolls and the bond further perfected.

To guard against the possibility of the non-metallic substances such as the liquid flux 14 contaminating the weld alloy at the layer 8, a molten metal having a melting temperature above the temperature at which the composite slab is heated for welding may be poured into the mold opening, as indicated in Figure 5, replacing the liquid flux 14, which floats to the top. As the molten flux has kept the section around the union and the bottom of the mold free from oxidation, the molten metal, which may be molten steel, welds readily to the adjacent surfaces and thereafter freezes and forms a seam weld about the margins of the surfaces 9 and 6. Since this pouring in of the molten steel or the like is done after the composite slab has been heated thoroughly and the stainless steel slab 7 has been expanded by the temperature increase, and after the gases expanded by the increase of temperature have escaped through the sealing flux 14, the parts may be joined together by the cast metal 15 in the condition at which they are prepared to bond.

I believe it is broadly new thus to weld the two slabs together while in heated condition.

The seam weld which is made at this stage overcomes the objection of arc welding around the edges of the union when the slabs are cold. The stainless steel slab is, according to my process, expanded and elongated out over the edges and ends of the block of mild steel, hence the joining of the two slabs 1 and 7 may be made without stress being imposed upon the junction or weld 15. Since the steel 15 is of a higher melting temperature than the temperature at which the blocks 1 and 7 are maintained in the furnace, the steel 15 tends to solidify, and even though it is at a high temperature, nevertheless maintains the two parts together with very considerable strength. The assembly may at this stage be subjected to pressure for perfecting the bond. Alternatively, the composite slab at this temperature and under the conditions above stated may be rolled immediately upon being taken from the bonding furnace, without the application of static pressure. For this purpose the cast seam weld produced as above described tends to hold the slabs together during the first and second passes, after which the weld of the opposing faces 9 and 6 will have been completed and the seam weld will have lost its primary usefulness.

I have found that subjecting the assembly, when heated, to pressure maintained for more than a mere instantaneous period will produce a better bond than the mere passage of the assembly through the rolls. A stronger and more uniform and better weld results from applying a heavy static pressure, even though the same is effective only for a relatively short time, such as from five to ten minutes, or even less, inasmuch as it appears to take more than instantaneous pressure to allow the metals at the junction to flow into the desired bonding relation.

I find that it is not necessary to employ static pressure prior to rolling, as the partly welded composite slabs, such as indicated in Figure 5, either taken directly from the bonding furnace or subsequently reheated to the desired rolling temperature, can be rolled and the weld be completed by the pressure of the reducing rolls.

If greater purchase of the seam welding material 15 upon the slabs 1 and 7 is required, recesses such as indicated at 17—18 in Figure 8 may be employed for this purpose.

A three-ply slab of mild steel with stainless clad on opposite sides may be produced in substantially the same way as heretofore described in connection with the single stainless facing. The procedure for producing the three-ply is shown in Figure 6. The lowermost stainless steel slab is provided with a peripheral mould wall formed by strip 19, this wall reaching above the top surface 22 of the stainless steel slab 18. A layer of powdered metal such as nickel, or nickel and copper, or powdered iron, or a mixture of powdered iron with powdered nickel, with or without powdered copper, is then sprinkled on the top face of the block 18. The bottom surface 20 of the mild steel slab 1, having previously been cleaned and sand blasted, is set upon the layer 23 of powdered metal. The mild steel block 1 has its upper surface surrounded by the strip 2 which forms a flaring tapered wall. The top surface 6 of this low carbon steel slab 1 is cleaned and sand blasted. The powdered metal 8 is sprinkled on the surface 6 and the top block 7 of stainless steel, with its surface 9 suitably cleaned and sand blasted, is placed on top of the layer 8 of powdered metal. The assembly is then subjected to heavy pressure, as illustrated in Figure 2. Flux material 14—14 is disposed in each of the mould channels after the assembly has been subjected to hydraulic pressure. The composite assembly is then placed in the furnace and subjected to the necessary heating operation, whereupon, as described in connection with Figure 5, molten steel or like metal may be poured into the troughs formed by the strips 2 and 19 to bond the adjacent blocks together. This bonding seam or strip such as 15 shown in Figure 5, is poured in as a molten metal and solidifies and holds the adjacent blocks together, serving as a bridging or seam weld. The three-ply assembly may then be passed through the reducing rolls, which completes the weld and converts the block as desired. It is to be understood that if desired, prior to rolling, static pressure may be applied to the assembly while the same is hot enough to thoroughly bond the adjacent surfaces together.

Double composite slabs may be formed as shown in Figure 7 by the same general procedure. The two slabs 25—26 of stainless steel are placed back-to-back with a separating compound between them. The separating compound may consist of aluminum oxide and silicate of soda applied as a paste and then dehydrated. The margins of the two slabs 26 and 27 are arc welded carefully, as indicated at 28, to exclude air and to hold the two parts together. This compound slab of stainless steel is suitably assembled between the two heavy low carbon steel slabs 24 and 27 with the powdered metal intervening. Mould strips 29 and 30 are secured respectively to the upper stainless steel slab 25 and to the lower or low carbon steel block 27 for protecting the junction between adjacent slabs where the permanent weld is to be effected. The assembly is treated in general as heretofore described, that is, compressed to compact the powder at the junction, and subjected to heating to raise the temperature to the desired degree. The meeting edges are protected by flux disposed in the grooves about them. The peripheral band of molten iron or steel, as explained in connection with Figure 5, may be poured into the grooves formed by the strips 29 and 30 to bond the parts and seal them. The assembly, while at welding temperature, may be subjected to static pressure or it may be directly passed through reducing rolls and rolled as a single piece, although consisting of a double composite slab. When the rolling has proceeded to the desired stage the edges may be sheared off to separate the resulting sheets.

As shown in Figure 9, a single mold strip 32 welded to the lower steel block 27 and extending above the junction of the upper steel block 24 with its adjacent stainless slab 25, may be employed instead of the two strips 29 and 30. Obviously, numerous modifications of the procedure may be employed.

In Figure 10 I have illustrated the procedure to produce the stainless steel clad on one side and copper clad on the other side of a central steel block 33. The stainless steel slab 34 is cleaned and has its top surface sand blasted and sprinkled with powdered metal to provide the layer 35. A mould strip such as 36 is erected around the junction and may be filled with a powdered flux material in due course. The layer of powdered metal 35 is compressed at a suitable stage which may be either before or after applying the upper mold strip 37. The upper mold strip 37 provides a peripheral wall about the upper surface 38 of the steel block 33. While the assembly of the block 33 and the plate or slab 34 is at substantially welding temperature, hot molten copper or copper alloy is poured into the upper mold, as indicated at 39, to the desired depth, which may be suitably predetermined by a notch in the wall 37, or by the height of the wall 37. The copper or copper alloy is allowed to solidify sufficiently to permit rolling, then the entire assembly, which may be around 1600 to 1650° F., is passed through the reducing rolls and may be converted to the desired finished gauge.

The procedure of my invention for producing stainless clad steel may be varied by employing molten stainless metal instead of a solid slab for forming a facing on the block of steel. Thus, as illustrated in Figure 11, the steel block 40 may be provided with the mold strip 42 which forms an open topped basin, the bottom of which is the top surface 43 of the low carbon steel block 40. In this case the mold strip which forms the side wall of the basin is shown as being offset at 44 in order to provide a narrow slot or groove 45 around the upper marginal edge of the lower block 40. Then, instead of placing the solid block bonded with powdered metal, as in Figure 1, the surface 43, which is previously cleaned and sand blasted, and which may be fluxed with borax and boric acid, or a similar flux, which flux may contain powdered nickel or powdered copper and nickel, or powdered iron, or a combination of these powdered metals, may then have the stainless steel poured directly thereupon to form a suitable thickness of stainless steel up to the height of the notch 46 in the mold wall 42, in one pouring. Alternatively, as hereinafter explained, the pouring may be in stages, to limit diffusion. By stage pouring the desired analysis may be secured in the outer layer.

Clad steels of similar melting temperatures, like stainless steel and mild steel, have been made by covering the back faces of two stainless steel slabs with a separating compound, arc welding the two together at the edges, placing on end in the center of a mold, and pouring molten mild steel to fill the mold. Alternatively, the mild steel may be placed in the center and the stainless steel poured. This creates a good bond between the stainless and mild steel, suitable for rolling. I have found, however, that it is very difficult to control the diffusion of one metal into the other, as the high temperature at which the stainless steel has to be poured melts some of the mild steel, or vice versa, changing the analysis of the high corrosion resistant metal.

The condition is exaggerated by the stainless steel insert being completely surrounded by the molten mild steel and insulated by the outer mould wall, so that heat radiation is very slow and uncontrollable. The method is limited to comparatively small size ingots, as it can be readily understood the larger the size the less control of cooling and the greater diffusion.

I have worked out a pouring method, a particular embodiment of which is shown in Figure 11. This method overcomes the objections to the above described known process and has certain definite advantages. One of the metals to be clad in a solid rectangular form is utilized to form the base of an open face mould. The steel strips 42, of suitable thickness and analysis, are erected by arc welding about the periphery, forming a completely liquid tight mould. These mould strips 42 may be of a particularly refractory metal. The upper surface 43 is cleaned, as by sand blasting, and covered with a fluxing material, such as powdered boric acid. The mould can be preheated or not, this being dependent upon the size and the particular metals to be bonded. If heated, the borax fuses and forms a liquid seal over the surface and if not heated the borax fuses immediately upon coming in contact with the molten metal as it is poured, and in either case excludes the atmosphere from the base metal surface. For large slabs, the mould is used cold, as the molten metal, in large mass, maintains sufficiently high temperature at the union to create a good bond, and the assembly being exposed to the air all around, radiates heat fast enough to prevent excessive diffusion of the two metals.

Further control of diffusion is accomplished by the speed of pouring or by intermittent pouring. If the top surface of the poured metal is kept from oxidizing, which it is, by the flux rising to the surface, or by additional flux added during pouring, the mould may be partly filled, then allowed to cool to any point above or below the freezing temperature. Then, when additional molten metal is poured, it does not penetrate to the original solid base metal, but melts only the upper part of the previously poured metal, leaving the last poured upper thickness substantially free from contamination with the base metal. This constitutes two distinct welding operations, as the first pouring is bonded to the base metal and the analysis may be changed to some extent thereby, while the second weld is between the first poured and the second poured similar metal, or the same metals, which bond readily to each other. This procedure definitely assures correct analysis of the outer surface of the high corrosion resisting material.

I prefer to use the mild steel for the base 40 of the mold and to pour the stainless steel onto the mild steel, which latter usually makes up 80% to 90% of the composite slab thickness and has a much higher conductivity, assuring faster dissipation of heat after pouring. One commercial advantage of pouring the stainless metal is that scrap stainless steel, for remelting, is available at approximately 5% of the cost of ferrochrome, which is used in making up stainless steel. There are certain metallurgical problems involved in remelting and in casting stainless steel scrap, particularly the low carbon chromium and low carbon nickel chromium, and the two pouring methods permit remelted stainless steel to form a part of the stainless facing, the rest, or upper pour, being then formed of metal of known analysis.

It is to be understood that in some cases it is desirable to utilize a wrought stainless steel slab for the mold base and to pour the mild steel thereupon as an optional procedure.

I believe it is broadly new to employ powdered metals for the bonding of a stainless steel slab to a low carbon steel backing, or in general to bond together two metal slabs of similar melting temperatures. Also, I believe it is broadly new to provide the flux seal about the joint where powdered metal or metal in solid or coherent form be used as a bonding metal.

I believe, also, that it is broadly new to employ the method of casting a peripheral band about the junction of the two slabs to be united.

Each of the above three features may be used independently, and known expedients employed in conjunction therewith.

Herein stainless steel is employed to designate corrosion resisting alloys of iron. These may be of any known or preferred analysis.

While the mould strips such as 2 and 19 are shown as flaring outwardly, this particular form is not essential as long as a suitable space about the edge is provided; see, for example, the strip 32 in Figure 9, or the strip 42 in Figure 11.

The seam weld 28 shown in Figures 7 and 9 may be made by casting a band about the same. Thus in Figure 9 the seam weld 28 might be omitted, since the poured band within the mould strip will hold all the pieces together.

I do not intend to be limited to the details shown and described, nor to the exact procedure herein recited, except as the same are specifically recited in the appended claims, inasmuch as modifications and variations will at once occur to those skilled in the art.

I claim:

1. The method of bonding a block of corrosion resisting alloy steel to a block of low carbon steel for cladding purposes, which comprises welding a mould strip about the upper surface of one of the blocks to provide a basin the bottom of which is formed by the face of the said block, depositing a layer of powdered bonding metal upon the top surface of said one block, superposing the other block upon said one block, pressing said blocks together to densify the powdered bonding material, disposing a sealing material in said basin about the second block, and heating the assembly to bonding temperature.

2. The method of claim 1 with the added step of pouring molten iron into the basin to weld the margins of the blocks together while the blocks are substantially at bonding temperature.

3. The method of bonding a block of corrosion resisting alloy steel to a block of low carbon steel for cladding purposes, which comprises welding a mould strip about the periphery of one block to form an open topped basin, covering the top face of said one block with powdered metal of the class of nickel, copper, and iron, superposing the other block upon the one block, pressing the blocks together to densify the powdered metal, disposing a flux of the class of borax and boric acid in the basin about the meeting faces, heating the assembly to melt the flux and thereafter to produce bonding of the powdered metal with the opposite faces of the blocks, and pouring into the basin about the meeting edges of the blocks a molten metal of a melting point above the temperature required for bonding.

4. The method of cladding low carbon steel on opposite sides with a corrosion resisting alloy steel, which comprises erecting a mould strip about the periphery of a first block of corrosion resisting alloy steel to form a basin, covering the face thereof with powdered bonding metal, superposing on the first block a block of low carbon steel, erecting a mould strip about the periphery of the second block to form a second basin, covering the face of the second block with a powdered bonding metal, superposing on the second block a third block of corrosion resisting alloy steel, compressing the assembly of three blocks, disposing a flux material in each basin to seal the meeting faces of the blocks, and heating the assembly to bond the meeting faces together.

5. The method of claim 4 with the additional step of pouring into each basin molten metal of a melting point higher than the bonding temperature required, whereby to form metallic joining strips bridging the meeting faces of the blocks.

6. An assembly for producing steel clad with corrosion resisting alloy steel, comprising a block of low carbon steel, a block of alloy steel, one of said blocks being superposed upon the other block, a layer of powdered bonding metal between the two blocks, a continuous mould strip welded to the lowermost block and providing an open channel about the meeting edges of the blocks for retaining a liquid sealing material in contact with the adjacent margins of the blocks.

7. The combination of claim 6 with a continuous mould strip about the upper margin of the upper block.

8. The combination of claim 6 with a continuous mould strip about the upper margin of the upper block, a third block superposed upon the other two, and a layer of powdered bonding metal between the face of the third block and the block below it.

9. The method of bonding two blocks of metal of approximately the same melting points, which comprises assembling the blocks in face-to-face relation with an intermediate layer of bonding metal, forming a mould about the edges of the meeting surfaces, and casting a continuous band of metal of a melting point not substantially lower than that of either block in said mould substantially only about said meeting faces to seal them together.

10. The method of claim 9, wherein the band is cast after the two blocks have been heated to substantially bonding temperature, whereby the difference in thermal expansion does not disturb the seal.

11. The method of cladding steel with a corrosion resisting steel on one side and a copper alloy on the other, which comprises superposing a steel block upon a block of alloy steel with a layer of bonding metal interposed, maintaining a liquid flux seal about the meeting edges and maintaining a liquid flux in contact with the top surface of the steel block while the assembly is raised to substantially bonding temperature, and while said assembly is at an elevated temperature pouring molten copper alloy upon the top surface of said block.

12. The method of claim 11 characterized by casting in situ a sealing band of steel about the edges of the meeting faces of the two blocks.

THOMAS B. CHACE.